July 21, 1925.
B. H. LEESON
1,547,053
ELECTRIC PROTECTIVE ARRANGEMENT
Filed April 16, 1925
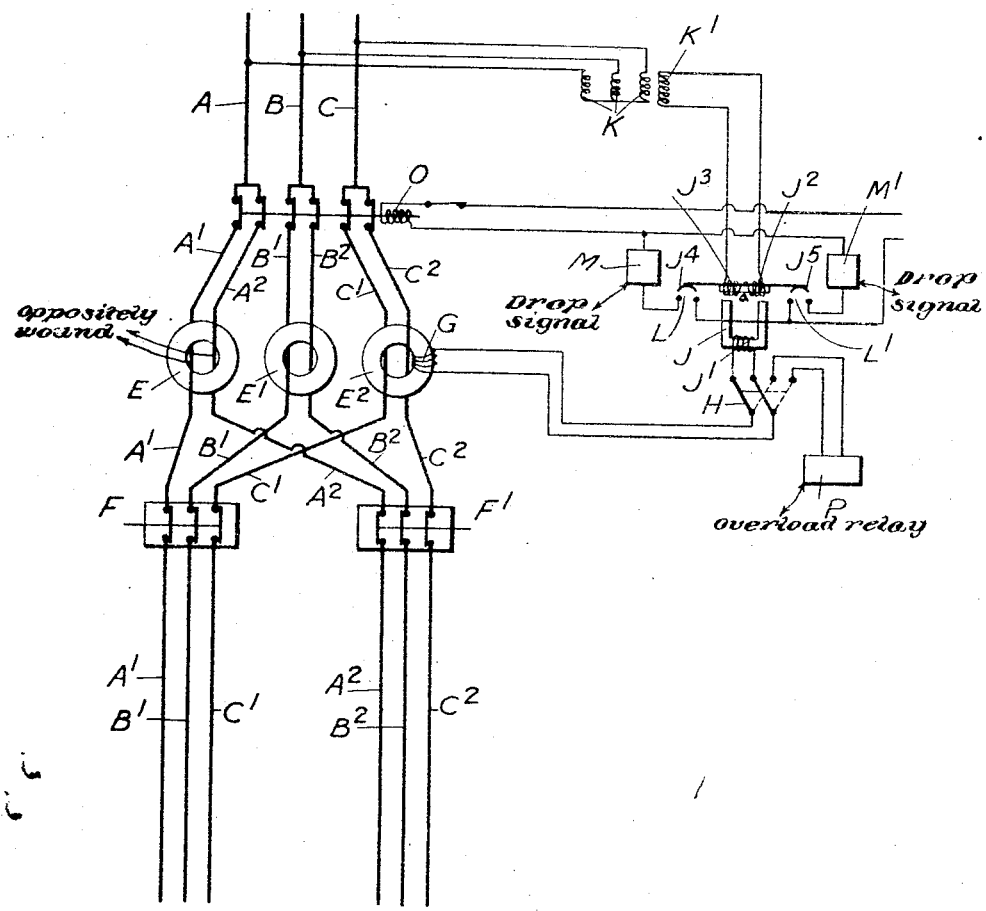
INVENTOR.
Bruce H. Leeson,
BY Watson, Coit, Morse & Grindle,
ATTY'S.

Patented July 21, 1925.

1,547,053

UNITED STATES PATENT OFFICE.

BRUCE HAMER LEESON, OF TYNEMOUTH, ENGLAND.

ELECTRIC PROTECTIVE ARRANGEMENT.

Application filed April 16, 1925. Serial No. 23,695.

*To all whom it may concern:*

Be it known that I, BRUCE HAMER LEESON, subject of the King of England, residing at Tynemouth, in the county of Northumberland, England, have invented certain new and useful Improvements in Electric Protective Arrangements, of which the following is a specification.

This invention relates to electric protective arrangements and has particular reference to the protection of parallel feeders, either in the form of cables or overhead lines, arranged on what is known as the split conductor system. An example of such a system would be a three-phase supply or distribution system in which each phase conductor is split, i. e. formed of two similar conductors, one of the parallel feeders consisting of three of such conductors and another parallel feeder of the other three.

It is known to protect such an arrangement by providing each pair of split conductors with a transformer whose secondary winding is energized when there is want of balance in the currents in the two split conductors due to a fault in one of them, the resulting current in the secondary winding operating through a relay to cut out both feeders. This known arrangement automatically discriminates between the two feeders and the rest of the system but if as is usually the case only one of the feeders is faulty and it be desired to put the sound feeder again into commission, tests are necessary and loss of time is involved.

The object of the present invention is to provide for such a case and its object is accomplished by so constructing and connecting the relay that it not only trips the two feeders out but also acts as an indicator to show which feeder is faulty. Thus without any test the faulty feeder can be cut out of the system by opening isolating switches and the remaining sound feeder replaced in commission where it preferably then works under overload protection.

This indicating or directional action of the relay is brought about by providing it with a potential or polarizing coil energized for instance from the secondary winding of a potential transformer on the supply mains. The other coil of the relay is in series with the secondary winding of the split conductor transformer in the usual way.

The polarizing coil is preferably wound upon an armature or other part of the relay which may be pivoted or otherwise mounted in movable relationship to the other portions of the relay. The relay is provided with two sets of tripping circuit contacts so that movement in either direction will trip out the feeders. The direction of movement will, however, depend upon the direction of flux in the core of the split conductor transformer which naturally is determined by which of the conductors is sound and which faulty.

The indication given by the relay may be of any convenient nature visible or audible.

Preferably the circuit connecting the relay with the secondary winding of the transformer is provided with a switch so arranged that as soon as the two feeders have been tripped out and the faulty feeder isolated, the sound feeder may be placed under overload protection. This switch may be of simple form arranged to break the connection to the indicating and tripping relay and make connection to an overload relay.

As an example of the application of the invention the following is given:—The supply mains of a three-phase system are split say at an oil switch and each pair of split phase conductors is taken through the core of a current transformer, one of such split phase conductors then passing through an isolating switch to one feeder and the other through another isolating switch to another feeder.

The secondary coil of each split conductor transformer is then connected through a switch to the operating coil of a relay which is made directional in its action by providing it with a polarizing coil energized from the secondary of the potential transformer. In this example one three-phase potential transformer might be employed having its primary coils connected to each of the supply phase conductors before they are split at the oil switch. These primary coils may be star-connected and the secondary coils also star-connected might be connected respectively to the polarizing coils of the relays. Each relay would have two sets of contacts appropriately connected to a common tripping circuit supplying current directly or indirectly to a trip coil on the main oil switch.

If it be desired to render the operations subsequent to the tripping out of the two feeders automatic this may be done by providing circuits and electromagnetic devices controlled by the relays which will act to open the isolating switches of the faulty feeder, place the overload relay in operative connection with the sound feeder and close the main oil switch.

The accompanying drawing is a diagram, illustrating a protective arrangement according to this invention.

In this diagram A, B and C represent split conductors or bus-bars each divided at an oil-break switch D into two conductors $A^1$ $A^2$; $B^1$ $B^2$; and $C^1$ $C^2$ respectively. Each pair of split conductors is furnished with a transformer represented by the cores E, $E^1$ and $E^2$ and after passing through the core one member of each split conductor is taken to an isolating switch F and the other member to another isolating switch $F^1$ so that there are two parallel feeders, one comprising the conductors $A^1$, $B^1$ and $C^1$ and the other the conductors $A^2$, $B^2$ and $C^2$. The two split conductors of each pair are passed through the transformer core in opposite directions.

Each of the split conductor transformers E $E^1$ and $E^2$ has a secondary winding but for the sake of clearness only one is shown at G. This secondary winding is joined through a switch H to the operating coil $J^1$ of a relay J having a pivoted armature $J^2$ wound with a polarizing coil $J^3$. This polarizing coil $J^3$ is energized from the secondary winding $K^1$ of a potential transformer whose star-connected primary windings K are joined to the split conductors A B and C.

The armature $J^2$ of the relay J bears two contacts $J^4$ and $J^5$ controlling respectively gaps L and $L^1$ in circuits containing indicators or signalling devices M and $M^1$. Each of these circuits forms part of a circuit end which includes a relay or electromagnet O controlling the main switch D.

Under normal conditions no current will flow through the secondary winding G of the split conductor transformer $E^2$ but if a fault occurs either on the conductor $C^1$ or $C^2$ a current will flow and will energize the operating coil $J^1$ of the relay. As the armature of that relay is polarized it will move one way if the fault occurs in $C^1$ and the other way if the fault is in $C^2$. In either case the circuit containing the main switch coil O is closed and the switch D opened. At the same time an indication is given at M or $M^1$ as to which feeder is faulty and consequently the appropriate isolating switch F or $F^1$ can be opened by hand to cut out the faulty feeder and the main switch may then be closed to put the sound feeder again into commission. Before doing this the switch H is moved into the dotted position thus cutting out the relay J and connecting the secondary winding G to some suitable overload protective device diagrammatically indicated at P.

It will be understood that the secondary windings of the other two split conductor transformers E and $E^1$ would be connected to relays similar to that described, that the armatures of those relays would be polarized from coils similar to the coil $K^1$ and that the operation of any one of the three relays would have the effect of energizing the coil O, opening the main switch D and giving an indication as to which feeder was faulty.

What I claim as my invention and desire to secure by Letters Patent is:—

1. In a protective arrangement for a three-phase parallel feeder split conductor system, the combination with three pairs of split conductors one pair in each phase, these split conductors being grouped together to form two feeders each having one conductor in each phase, of an iron core ring type current transformer for each phase the two split conductors in that phase being passed through the transformer core in opposite directions, a secondary winding for each current transformer, a relay in circuit with such secondary winding, means operated by the relay for cutting out the two feeders when a fault occurs on one or other of them, and means including said means whereby the relay is caused to give an indication as to which of the two feeders is faulty.

2. In a protective arrangement for a parallel feeder split conductor system, the combination with a pair of split conductors, of an iron core ring type transformer through the core of which the two conductors of the pair are passed in opposite directions, a secondary winding for the transformer, a relay including a movable member in circuit with such secondary winding, means operated by the relay for cutting out the pair of split conductors when a fault occurs on one of the other of them, and means whereby the moving member of the relay is given a directional movement depending on the direction of the magnetic flux in the transformer core.

3. In a protective arrangement for a three-phase parallel feeder split conductor system, the combination with three pairs of split conductors one pair in each phase, these split conductors being grouped together to form two feeders each having one conductor in each phase, of an iron core ring type current transformer for each phase the two split conductors in that phase being passed through the transformer core in opposite directions, a secondary winding for each current transformer, a relay including a member movable in opposite directions in circuit with such secondary winding, means operated by the relay for cutting out the two feeders when a fault occurs on one or other of them, and a polarizing coil on the relay energized from the main conductors whereby the moving member of the relay is given a directional movement depending on the direction of the magnetic flux in the transformer core.

4. In a protective arrangement for a parallel feeder split conductor system, the combination with a pair of split conductors, of a current transformer linked with the two conductors of the pair, a secondary winding for the current transformer, circuit-breaking means for cutting out the pair of split conductors, and a relay including a member moving in opposite directions and having two pairs of contacts having an operating coil in circuit with the current transformer secondary winding, a polarizing coil interacting with the operating coil energized from the main conductors, two sets of contacts, and a contact means operated by said member so that when a fault occurs on one of the conductors this member will close one set of contacts and operate the circuit-breaking means whilst when a fault occurs on the other conductor the member will close the other set of contacts and operate the circuit-breaking means.

In testimony whereof I have signed my name to this specification.

BRUCE HAMER LEESON.